US010346794B2

(12) United States Patent
High et al.

(10) Patent No.: US 10,346,794 B2
(45) Date of Patent: Jul. 9, 2019

(54) ITEM MONITORING SYSTEM AND METHOD

(71) Applicant: Walmart Apollo, LLC, Bentonville, AR (US)

(72) Inventors: Donald R. High, Noel, MO (US); Brian G. McHale, Chadderton Oldham (GB)

(73) Assignee: Walmart Apollo, LLC, Bentonville, AR (US)

( * ) Notice: Subject to any disclaimer, the term of this patent is extended or adjusted under 35 U.S.C. 154(b) by 204 days.

(21) Appl. No.: 15/061,443

(22) Filed: Mar. 4, 2016

(65) Prior Publication Data

US 2016/0260055 A1     Sep. 8, 2016

Related U.S. Application Data

(60) Provisional application No. 62/129,729, filed on Mar. 6, 2015.

(51) Int. Cl.
*G06Q 10/00* (2012.01)
*G06Q 10/08* (2012.01)
(Continued)

(52) U.S. Cl.
CPC ....... *G06Q 10/087* (2013.01); *G06F 16/5854* (2019.01); *G06K 9/00771* (2013.01)

(58) Field of Classification Search
CPC .................. G06Q 10/087; G06F 17/30259
(Continued)

(56) References Cited

U.S. PATENT DOCUMENTS

| 1,001,732 A | 8/1911 | Cummings |
| 1,774,653 A | 9/1930 | Marriott |

(Continued)

FOREIGN PATENT DOCUMENTS

| CA | 2524037 | 5/2006 |
| CA | 2625885 | 4/2007 |

(Continued)

OTHER PUBLICATIONS

Kumar, Swagat; "Robotics-as-a-Service: Transforming the Future of Retail", Tata Consultancy Services, http://www.tcs.com/resources/white_papers/Pages/Robotics-as-Service.aspx, printed on May 13, 2015, pp. 1-4.

(Continued)

*Primary Examiner* — Rokib Masud
(74) *Attorney, Agent, or Firm* — Fitch, Even, Tabin & Flannery LLP

(57) ABSTRACT

Methods and apparatus are provided to monitor items on a storage unit. Some embodiments provide a system for monitoring items held on a storage unit, comprising: a scanner device configured to capture a 3D model of the storage unit; a memory configured to store a baseline 3D model of the storage unit in a predetermined stocked state and a plurality of 3D item models, each 3D item model corresponding to an item intended to be held on the storage unit; a difference extraction unit configured to compare the captured 3D model to the baseline 3D model and generate 3D difference data corresponding to a difference between the captured and baseline 3D models, and a product identification unit configured to identify items present in the 3D difference data based on the stored plurality of 3D item models.

16 Claims, 6 Drawing Sheets

(51) Int. Cl.
*G06F 16/583* (2019.01)
*G06K 9/00* (2006.01)

(58) Field of Classification Search
USPC .................................................. 705/16, 28
See application file for complete search history.

(56) References Cited

U.S. PATENT DOCUMENTS

| | | | |
|---|---|---|---|
| 2,669,345 A | 2/1954 | Brown |
| 3,765,546 A | 10/1973 | Westerling |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | George, II |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,850,899 B1 | 2/2005 | Chow |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | DeLazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyama |
| 7,648,068 B2 | 1/2010 | Silverbrook |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |
| 7,783,527 B2 | 8/2010 | Bonner |
| 7,787,985 B2 | 8/2010 | Tsujimoto |
| 7,817,394 B2 | 10/2010 | Mukherjee |
| 7,826,919 B2 | 11/2010 | D'Andrea |
| 7,835,281 B2 | 11/2010 | Lee |
| 7,894,932 B2 | 2/2011 | Mountz |
| 7,894,939 B2 | 2/2011 | Zini |
| 7,957,837 B2 | 6/2011 | Ziegler |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stiffer |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |

(56) References Cited

U.S. PATENT DOCUMENTS

| | | |
|---|---|---|
| 8,380,349 B1 | 2/2013 | Hickman |
| 8,393,846 B1 | 3/2013 | Coots |
| 8,412,400 B2 | 4/2013 | DAndrea |
| 8,423,280 B2 | 4/2013 | Edwards |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |
| 8,798,786 B2 | 8/2014 | Wurman |
| 8,798,840 B2 | 8/2014 | Fong |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Bishop |
| 8,882,432 B2 | 11/2014 | Bastian, II |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peeters |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1 | 4/2015 | Agarwal |
| 9,008,827 B1 | 4/2015 | Dwarakanath |
| 9,008,829 B2 | 4/2015 | Worsley |
| 9,014,848 B2 | 4/2015 | Farlow |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 9,278,839 B2 | 3/2016 | Gilbride |
| 9,305,280 B1 | 4/2016 | Berg |
| 9,329,597 B2 | 5/2016 | Stoschek |
| 9,495,703 B1 | 11/2016 | Kaye, III |
| 9,534,906 B2 | 1/2017 | High |
| 9,550,577 B1 | 1/2017 | Beckman |
| 9,573,684 B2 | 2/2017 | Kimchi |
| 9,578,282 B1 | 2/2017 | Sills |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,663,292 B1 | 5/2017 | Brazeau |
| 9,663,293 B2 | 5/2017 | Wurman |
| 9,663,295 B1 | 5/2017 | Wurman |
| 9,663,296 B1 | 5/2017 | Dingle |
| 9,747,480 B2 | 8/2017 | McAllister |
| 9,757,002 B2 | 9/2017 | Thompson |
| 9,796,093 B2 | 10/2017 | Mascorro Medina |
| 9,801,517 B2 | 10/2017 | High |
| 9,827,678 B1 | 11/2017 | Gilbertson |
| 9,875,502 B2 | 1/2018 | Kay |
| 9,875,503 B2 | 1/2018 | High |
| 9,896,315 B2 | 3/2018 | High |
| 9,908,760 B2 | 3/2018 | High |
| 9,948,917 B2 | 4/2018 | Inacio De Matos |
| 9,994,434 B2 | 6/2018 | High |
| 10,017,322 B2 | 7/2018 | High |
| 10,071,891 B2 | 9/2018 | High |
| 10,071,892 B2 | 9/2018 | High |
| 10,071,893 B2 | 9/2018 | High |
| 10,081,525 B2 | 9/2018 | High |
| 10,130,232 B2 | 11/2018 | Atchley |
| 10,138,100 B2 | 11/2018 | Thompson |
| 10,189,691 B2 | 1/2019 | High |
| 10,189,692 B2 | 1/2019 | High |
| 2001/0042024 A1 | 11/2001 | Rogers |
| 2002/0060542 A1 | 5/2002 | Song |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0170961 A1 | 11/2002 | Dickson |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0104547 A1 | 5/2005 | Wang |
| 2005/0149414 A1 | 7/2005 | Schrodt |
| 2005/0154265 A1 | 7/2005 | Miro |
| 2005/0177446 A1 | 8/2005 | Hoblit |
| 2005/0216126 A1 | 9/2005 | Koselka |

(56) References Cited

U.S. PATENT DOCUMENTS

| | | | |
|---|---|---|---|
| 2005/0222712 A1 | 10/2005 | Orita | |
| 2005/0230472 A1 | 10/2005 | Chang | |
| 2005/0238465 A1 | 10/2005 | Razumov | |
| 2006/0107067 A1 | 5/2006 | Safal | |
| 2006/0147087 A1 | 7/2006 | Goncalves | |
| 2006/0163350 A1 | 7/2006 | Melton | |
| 2006/0178777 A1 | 8/2006 | Park | |
| 2006/0206235 A1 | 9/2006 | Shakes | |
| 2006/0210382 A1 | 9/2006 | Mountz | |
| 2006/0220809 A1 | 10/2006 | Stigall | |
| 2006/0221072 A1 | 10/2006 | Se | |
| 2006/0231301 A1 | 10/2006 | Rose | |
| 2006/0235570 A1 | 10/2006 | Jung | |
| 2006/0241827 A1 | 10/2006 | Fukuchi | |
| 2006/0244588 A1 | 11/2006 | Hannah | |
| 2006/0279421 A1 | 12/2006 | French | |
| 2006/0293810 A1 | 12/2006 | Nakamoto | |
| 2007/0005179 A1 | 1/2007 | Mccrackin | |
| 2007/0017855 A1 | 1/2007 | Pippin | |
| 2007/0045018 A1 | 3/2007 | Carter | |
| 2007/0061210 A1 | 3/2007 | Chen | |
| 2007/0069014 A1 | 3/2007 | Heckel | |
| 2007/0072662 A1 | 3/2007 | Templeman | |
| 2007/0085682 A1 | 4/2007 | Murofushi | |
| 2007/0125727 A1 | 6/2007 | Winkler | |
| 2007/0150368 A1 | 6/2007 | Arora | |
| 2007/0152057 A1 | 7/2007 | Cato | |
| 2007/0222679 A1 | 9/2007 | Morris | |
| 2007/0269299 A1 | 11/2007 | Ross | |
| 2007/0284442 A1 | 12/2007 | Herskovitz | |
| 2007/0288123 A1 | 12/2007 | D Andrea | |
| 2007/0288127 A1 | 12/2007 | Haq | |
| 2007/0293978 A1 | 12/2007 | Wurman | |
| 2008/0011836 A1 | 1/2008 | Adema | |
| 2008/0031491 A1 | 2/2008 | Ma | |
| 2008/0041644 A1 | 2/2008 | Tudek | |
| 2008/0042836 A1 | 2/2008 | Christopher | |
| 2008/0075566 A1 | 3/2008 | Benedict | |
| 2008/0075568 A1 | 3/2008 | Benedict | |
| 2008/0075569 A1 | 3/2008 | Benedict | |
| 2008/0077511 A1 | 3/2008 | Zimmerman | |
| 2008/0105445 A1 | 5/2008 | Dayton | |
| 2008/0131255 A1 | 6/2008 | Hessler | |
| 2008/0140253 A1 | 6/2008 | Brown | |
| 2008/0154720 A1 | 6/2008 | Gounares | |
| 2008/0201227 A1 | 8/2008 | Bakewell | |
| 2008/0226129 A1 | 9/2008 | Kundu | |
| 2008/0267759 A1 | 10/2008 | Morency | |
| 2008/0281515 A1 | 11/2008 | Ann | |
| 2008/0281664 A1 | 11/2008 | Campbell | |
| 2008/0294288 A1 | 11/2008 | Yamauchi | |
| 2008/0306787 A1 | 12/2008 | Hamilton | |
| 2008/0308630 A1 | 12/2008 | Bhogal | |
| 2008/0314667 A1 | 12/2008 | Hannah | |
| 2009/0074545 A1 | 3/2009 | Lert | |
| 2009/0132250 A1 | 5/2009 | Chiang | |
| 2009/0134572 A1 | 5/2009 | Obuchi | |
| 2009/0138375 A1* | 5/2009 | Schwartz | G06Q 30/0601 705/26.1 |
| 2009/0154708 A1 | 6/2009 | Kolar Sunder | |
| 2009/0155033 A1 | 6/2009 | Olsen | |
| 2009/0164902 A1 | 6/2009 | Cohen | |
| 2009/0177323 A1 | 7/2009 | Ziegler | |
| 2009/0210536 A1 | 8/2009 | Allen | |
| 2009/0240571 A1 | 9/2009 | Bonner | |
| 2009/0259571 A1 | 10/2009 | Ebling | |
| 2009/0265193 A1 | 10/2009 | Collins | |
| 2009/0269173 A1 | 10/2009 | De Leo | |
| 2009/0299822 A1 | 12/2009 | Harari | |
| 2009/0319399 A1 | 12/2009 | Resta | |
| 2010/0025964 A1 | 2/2010 | Fisk | |
| 2010/0030417 A1 | 2/2010 | Fang | |
| 2010/0076959 A1* | 3/2010 | Ramani | G06F 17/50 707/722 |
| 2010/0131103 A1 | 5/2010 | Herzog | |
| 2010/0138281 A1 | 6/2010 | Zhang | |
| 2010/0143089 A1 | 6/2010 | Hvass | |
| 2010/0171826 A1 | 7/2010 | Hamilton | |
| 2010/0176922 A1 | 7/2010 | Schwab | |
| 2010/0211441 A1 | 8/2010 | Sprigg | |
| 2010/0222925 A1 | 9/2010 | Anezaki | |
| 2010/0262278 A1 | 10/2010 | Winkler | |
| 2010/0268697 A1 | 10/2010 | Karlsson | |
| 2010/0295847 A1* | 11/2010 | Titus | G06T 17/00 345/419 |
| 2010/0299065 A1 | 11/2010 | Mays | |
| 2010/0302102 A1 | 12/2010 | Desai | |
| 2010/0316470 A1 | 12/2010 | Lert | |
| 2010/0324773 A1 | 12/2010 | Choi | |
| 2011/0010023 A1 | 1/2011 | Kunzig | |
| 2011/0022201 A1 | 1/2011 | Reumerman | |
| 2011/0098920 A1 | 4/2011 | Chuang | |
| 2011/0153081 A1 | 6/2011 | Romanov | |
| 2011/0163160 A1 | 7/2011 | Zini | |
| 2011/0176803 A1 | 7/2011 | Song | |
| 2011/0225071 A1 | 9/2011 | Sano | |
| 2011/0238211 A1 | 9/2011 | Shirado | |
| 2011/0240777 A1 | 10/2011 | Johns | |
| 2011/0258060 A1 | 10/2011 | Sweeney | |
| 2011/0260865 A1 | 10/2011 | Bergman | |
| 2011/0279252 A1 | 11/2011 | Carter | |
| 2011/0288684 A1 | 11/2011 | Farlow | |
| 2011/0288763 A1 | 11/2011 | Hui | |
| 2011/0295424 A1 | 12/2011 | Johnson | |
| 2011/0301757 A1 | 12/2011 | Jones | |
| 2011/0320034 A1 | 12/2011 | Dearlove | |
| 2011/0320322 A1 | 12/2011 | Roslak | |
| 2012/0000024 A1 | 1/2012 | Layton | |
| 2012/0029697 A1 | 2/2012 | Ota | |
| 2012/0035823 A1 | 2/2012 | Carter | |
| 2012/0046998 A1 | 2/2012 | Staib | |
| 2012/0059743 A1 | 3/2012 | Rao | |
| 2012/0072303 A1 | 3/2012 | Brown | |
| 2012/0134771 A1 | 5/2012 | Larson | |
| 2012/0143726 A1 | 6/2012 | Chirnomas | |
| 2012/0166241 A1 | 6/2012 | Livingston | |
| 2012/0185094 A1 | 7/2012 | Rosenstein | |
| 2012/0185355 A1 | 7/2012 | Kilroy | |
| 2012/0192260 A1 | 7/2012 | Kontsevich | |
| 2012/0197431 A1 | 8/2012 | Toebes | |
| 2012/0226556 A1 | 9/2012 | Itagaki | |
| 2012/0239224 A1 | 9/2012 | McCabe | |
| 2012/0255810 A1 | 10/2012 | Yang | |
| 2012/0259732 A1 | 10/2012 | Sasankan | |
| 2012/0272500 A1 | 11/2012 | Reuteler | |
| 2012/0294698 A1 | 11/2012 | Villamar | |
| 2012/0303263 A1 | 11/2012 | Alam | |
| 2012/0303479 A1 | 11/2012 | Derks | |
| 2012/0330458 A1 | 12/2012 | Weiss | |
| 2013/0016011 A1 | 1/2013 | Harriman | |
| 2013/0026224 A1 | 1/2013 | Ganick | |
| 2013/0051667 A1 | 2/2013 | Deng | |
| 2013/0054052 A1 | 2/2013 | Waltz | |
| 2013/0054280 A1 | 2/2013 | Moshfeghi | |
| 2013/0060461 A1 | 3/2013 | Wong | |
| 2013/0073405 A1 | 3/2013 | Ariyibi | |
| 2013/0080289 A1 | 3/2013 | Roy | |
| 2013/0096735 A1 | 4/2013 | Byford | |
| 2013/0103539 A1 | 4/2013 | Abraham | |
| 2013/0105036 A1 | 5/2013 | Smith | |
| 2013/0110671 A1 | 5/2013 | Gray | |
| 2013/0141555 A1 | 6/2013 | Ganick | |
| 2013/0145572 A1 | 6/2013 | Schregardus | |
| 2013/0151335 A1 | 6/2013 | Avadhanam | |
| 2013/0174371 A1 | 7/2013 | Jones | |
| 2013/0181370 A1 | 7/2013 | Rafie | |
| 2013/0211953 A1 | 8/2013 | Abraham | |
| 2013/0218453 A1 | 8/2013 | Geelen | |
| 2013/0231779 A1 | 9/2013 | Purkayastha | |
| 2013/0235206 A1 | 9/2013 | Smith | |
| 2013/0238130 A1 | 9/2013 | Dorschel | |
| 2013/0245810 A1 | 9/2013 | Sullivan | |
| 2013/0276004 A1 | 10/2013 | Boncyk | |

(56) References Cited

U.S. PATENT DOCUMENTS

| | | |
|---|---|---|
| 2013/0300729 A1* | 11/2013 | Grimaud .............. G06Q 10/087 345/419 |
| 2013/0302132 A1 | 11/2013 | DAndrea |
| 2013/0309637 A1 | 11/2013 | Minvielle |
| 2013/0317642 A1 | 11/2013 | Asaria |
| 2013/0333961 A1 | 12/2013 | ODonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |
| 2014/0136414 A1 | 5/2014 | Abhyanker |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0266616 A1 | 9/2014 | Jones |
| 2014/0267409 A1 | 9/2014 | Fein |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1 | 9/2014 | Kim |
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1 | 10/2014 | Partovi |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344011 A1 | 11/2014 | Dogin |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0006319 A1 | 1/2015 | Thomas |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0073589 A1 | 3/2015 | Khodl |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1 | 7/2015 | Holtan |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |
| 2016/0101940 A1 | 4/2016 | Grinnell |
| 2016/0110701 A1 | 4/2016 | Herring |
| 2016/0114488 A1 | 4/2016 | Mascorro Medina |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |

(56) References Cited

U.S. PATENT DOCUMENTS

| | | |
|---|---|---|
| 2016/0288687 A1 | 10/2016 | Scherle |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0080846 A1 | 3/2017 | Lord |
| 2017/0107055 A1 | 4/2017 | Magens |
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0283171 A1 | 10/2017 | High |
| 2017/0355081 A1 | 12/2017 | Fisher |
| 2018/0020896 A1 | 1/2018 | High |
| 2018/0068357 A1 | 3/2018 | High |
| 2018/0075403 A1 | 3/2018 | Mascorro Medina |
| 2018/0099846 A1 | 4/2018 | High |
| 2018/0170729 A1 | 6/2018 | High |
| 2018/0170730 A1 | 6/2018 | High |
| 2018/0273292 A1 | 9/2018 | High |
| 2018/0282139 A1 | 10/2018 | High |
| 2018/0346299 A1 | 12/2018 | High |
| 2018/0346300 A1 | 12/2018 | High |
| 2019/0002256 A1 | 1/2019 | High |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

UKIPO; App. No. GB1602881.3; Combined Search and Examination Report dated Jun. 23, 2016.
PCT; App. No. PCT/IB2016/050852; International Search Report and Written Opinion dated Jun. 10, 2016.
U.S. Appl. No. 15/060,953, filed Mar. 4, 2016, High.
U.S. Appl. No. 15/061,025, filed Mar. 4, 2016, High.
U.S. Appl. No. 15/061,054, filed Mar. 4, 2016, Kay.
U.S. Appl. No. 15/061,203, filed Mar. 4, 2016, High.
U.S. Appl. No. 15/061,265, filed Mar. 4, 2016, High.
U.S. Appl. No. 15/061,285, filed Mar. 4, 2016, High.
U.S. Appl. No. 15/061,325, filed Mar. 4, 2016, High.
U.S. Appl. No. 15/061,350, filed Mar. 4, 2016, Thompson.
U.S. Appl. No. 15/061,402, filed Mar. 4, 2016, High.
U.S. Appl. No. 15/061,406, filed Mar. 4, 2016, High.

(56) References Cited

OTHER PUBLICATIONS

U.S. Appl. No. 15/061,474, filed Mar. 4, 2016, High.
U.S. Appl. No. 15/061,507, filed Mar. 4, 2016, High.
U.S. Appl. No. 15/061,671, filed Mar. 4, 2016, High.
U.S. Appl. No. 15/061,677, filed Mar. 4, 2016, Taylor.
U.S. Appl. No. 15/061,686, filed Mar. 4, 2016, High.
U.S. Appl. No. 15/061,688, filed Mar. 4, 2016, Thompson.
U.S. Appl. No. 15/061,722, filed Mar. 4, 2016, High.
U.S. Appl. No. 15/061,770, filed Mar. 4, 2016, Atchley.
U.S. Appl. No. 15/061,792, filed Mar. 4, 2016, Winkle.
U.S. Appl. No. 15/061,801, filed Mar. 4, 2016, High.
U.S. Appl. No. 15/061,805, filed Mar. 4, 2016, Atchley.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016, High.
U.S. Appl. No. 15/061,980, filed Mar. 4, 2016, Thompson.
Abbrobotics; "ABB Robotics—Innovative Packaging Solutions", https://www.youtube.com/watch?v=e5jif-IUvHY, published on May 16, 2013, pp. 1-5.
Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.
Avezbadalov, Ariel, et al.; "Snow Shoveling Robot", engineering.nyu.edu/mechatronics/projects/ME3484/2006/Snow Shoveling Robot/Mechatronics Snow Robot Presentation Update 12-19-06.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, May 9, 2011, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtCIxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
Denso; "X-mobility", Oct. 10, 2014, pp. 1-2, including machine translation.
DHL; "Self-Driving Vehicles in Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, May 19, 2015, pp. 1-3.
Fellowrobots; "Oshbot Progress—Fellow Robots", https://vimeo.com/139532370, published Sep. 16, 2015, pp. 1-5.
Fora.TV; "A Day in the Life of a Kiva Robot", https://www.youtube.com/watch?v=6KRjuuEVEZs, published on May 11, 2011, pp. 1-11.
Gamma2Video; "FridayBeerBot.wmv", https://www.youtube.com/watch?v=KXXIIDYatxQ, published on Apr. 27, 2010, pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Glas, Dylan F., et al.; "The Network Robot System: Enabling Social Human-Robot Interaction in Public Spaces", Journal of Human-Robot Interaction, vol. 1, No. 2, 2012, pp. 5-32.

(56) References Cited

OTHER PUBLICATIONS

Green, A., et al; "Report on evaluation of the robot trolley", CommRob IST-045441, Advanced Behaviour and High-Level Multimodal Communications with and among Robots, Jun. 14, 2010, pp. 10-67.
Gross, H.-M., et al.; TOOMAS: Interactive Shopping Guide Robots in Everyday Use—Final Implementation and Experiences from Long-term Field Trials, Proc. IEEE/ RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Kiva's warehouse automation system is the most powerful and flexible A . . . ", http://www.kivasystems.com/solutions/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.

Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Lejepekov, Fedor; "Yuki-taro. Snow recycle robot.", https://www.youtube.com/watch?v=gI2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavathi, P.; "Automatic Docking System with Recharging and Battery Replacement for Surveillance Robot", International Journal of Electronics and Computer Science Engineering, 2012, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
Neurobtv; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec 15-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Onozato, Taishi et al.; "A Control System for the Robot Shopping Cart"; 2010 IRAST International Congress on Computer Applications and Computational Science (CACS 2010); 2010; pp. 907-910.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.

(56) References Cited

OTHER PUBLICATIONS

Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robotonics/savione-the-butler-bot-service-for-hospitality-industry.html, Aug. 14, 2014, pp. 1-5.
SK Telecom Co.; "SK Telecom Launches Smart Cart Pilot Test in Korea"; http://www.sktelecom.com/en/press/press_detail.do?idx=971; Oct. 4, 2011; pp. 1-2.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the NEW Stewart Golf X9 Follow", https://www.youtube.com/watch?v=HHivFGtiuE, published on Apr. 9, 2014, pp. 1-9.
Sun, Eric; ""Smart Bin & Trash Route" system—RMIT 2012 Green Inventors Competition", http://www.youtube.com/watch?v=OrTA57aIO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
UKIPO; App. No. 1602881.3; Office Action dated Feb. 1, 2018.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", Apr. 18, 2005, pp. 1-7.
Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
Wired; "High-Speed Robots Part 1: Meet BettyBot in "Human Exclusion Zone" Warehouses-The Window-Wired", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
Yrf; "The Diamond Robbery—Scene Dhoom:2 Hrithik Roshan", https://www.youtube.com/watch?v=3bMYgo_S0Kc, published on Jul. 12, 2012, pp. 1-7.
U.S. Appl. No. 15/061,443, filed Mar. 4, 2016, High.
U.S. Appl. No. 15/274,991, filed Jan. 12, 2017, Donald R. High.
U.S. Appl. No. 15/275,009, filed Sep. 23, 2016, Donald R. High.
U.S. Appl. No. 15/275,019, filed Sep. 23, 2016, Donald R. High.
U.S. Appl. No. 15/275,047, filed Sep. 23, 2016, Donald R. High.
U.S. Appl. No. 15/282,951, filed Sep. 30, 2016, Donald R. High.
U.S. Appl. No. 15/288,923, filed Oct. 7, 2016, Donald R. High.
U.S. Appl. No. 15/423,812, filed Feb. 3, 2017, Donald R. High.
U.S. Appl. No. 15/446,914, filed Mar. 1, 2017, Donald R. High.
U.S. Appl. No. 15/447,175, filed Mar. 2, 2017, Donald R. High.
U.S. Appl. No. 15/447,202, filed Mar. 2, 2017, Donald R. High.
U.S. Appl. No. 15/471,278, filed Mar. 28, 2017, Donald R. High.
U.S. Appl. No. 15/692,226, filed Aug. 31, 2017, Donald R. High.
U.S. Appl. No. 15/836,708, filed Dec. 8, 2017, Donald R. High.
U.S. Appl. No. 15/892,250, filed Feb. 8, 2018, Donald R. High.
U.S. Appl. No. 15/894,155, filed Feb. 12, 2018, Donald R. High.
Budgee; "The Robotic Shopping Cart Budgee"; https://www.youtube.com/watch?v=2dYNdVPF4VM; published on Mar. 20, 2015; pp. 1-6.
Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Follow Inspiration; "wiiGO"; https://www.youtube.com/watch?v=dhHXIdpknC4; published on Jun. 16, 2015; pp. 1-7.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
Technion; "Autonomous Tracking Shopping Cart—Shopping Made Easy from Technion"; https://www.youtube.com/watch?v=pQcb9fofmXg; published on Nov. 23, 2014; pp. 1-10.
U.S. Appl. No. 15/698,068, filed Sep. 7, 2017, High Donald R.
U.S. Appl. No. 15/990,274, filed May 25, 2018, High Donald R.
U.S. Appl. No. 16/001,774, filed Jun. 6, 2018, High Donald R.
U.S. Appl. No. 16/059,431, filed Aug. 9, 2018, High Donald R.
U.S. Appl. No. 16/100,064, filed Aug. 9, 2018, High Donald R.
U.S. Appl. No. 16/109,290, filed Aug. 22, 2018, High Donald R.
U.S. Appl. No. 16/191,192, filed Nov. 14, 2018, Thompson John P.
U.S. Appl. No. 16/216,147, filed Dec. 11, 2018, High Donald R.
U.S. Appl. No. 16/224,536, filed Dec. 18, 2018, High Donald R.
U.S. Appl. No. 16/269,262, filed Feb. 6, 2019, High Donald R.
U.S. Appl. No. 16/282,888, filed Feb. 22, 2019, Brian G. McHale.

\* cited by examiner

ITEM MONITORING SYSTEM AND METHOD

RELATED APPLICATION

This application claims the benefit of U.S. Provisional Application No. 62/129,729, filed Mar. 6, 2015, for Donald R. High et al., entitled ITEM MONITORING SYSTEM AND METHOD, which is incorporated in its entirety herein by reference.

FIELD OF THE INVENTION

This invention relates to item monitoring systems and methods.

BACKGROUND OF THE INVENTION

Modern retail stores sell a wide variety of items, including foodstuffs, home and kitchen goods, electronic goods, clothing, sporting goods and so on. Typically, the items are displayed on storage units with other similar products. Often the storage units are shelving units, though of course other forms of storage unit are often employed. The items are removed from the display units by customers, and taken to a point of sale or checkout to be purchased, and the units are replenished with items by retail store staff on a periodic basis.

In one example, the items on the units are replenished periodically. For example, the units may be replenished after the store closes each day. In such an example, if a particular item on the unit is exhausted during the day, it may not be replaced until several hours later, potentially resulting in lost sales. Equally, if instead retail store staff attempt to replenish the items on a more frequent basis, it may be the case that not enough of the items have been sold to warrant replenishment.

Increasingly, retail stores stay open for longer hours to provide greater customer convenience, with some stores opening 24 hours a day. In such stores, the replenishment of items must take place during the opening hours of the store. Consequently, there is a desire to replenish the units in such a way that customers are minimally inconvenienced by the presence of containers of stock on the shop floor.

In other examples, the items on the units may be replenished on an ad hoc basis, for example on the basis of a staff member inspecting the retail units and noting which items require replenishment. Whilst this may be manageable in a small store and in quiet periods, in large retail stores, such a system is error prone and difficult to manage in today's very large retail stores, which can occupy areas well in excess of 10,000 m$^2$ and stock hundreds of thousands of different products.

A further difficulty arises in that items may be removed from the storage units by customers or staff and later incorrectly replaced thereon, leading to untidy and visually unappealing storage units. Also, the storage units may not be correctly stocked when the items are replenished by store staff. These erroneously displayed items may inconvenience other shoppers and may result in fewer sales of the items displayed on the untidy units.

SUMMARY OF THE INVENTION

Some embodiments of the present invention address at least some of the above difficulties, or other difficulties which will be appreciated from the description below. Further some embodiments provide convenient, accurate and cost effective systems and methods for monitoring the items on a storage unit.

According to some embodiments, there is provided a system for monitoring items held on a storage unit, comprising:
  a scanner device configured to capture a 3D model of the storage unit;
  a memory configured to store a baseline 3D model of the storage unit in a predetermined stocked state and a plurality of 3D item models, each 3D item model corresponding to an item intended to be held on the storage unit;
  a difference extraction unit configured to compare the captured 3D model to the baseline 3D model and generate 3D difference data corresponding to a difference between the captured and baseline 3D models, and
  a product identification unit configured to identify items present in the 3D difference data based on the stored plurality of 3D item models.

In one embodiment, the product identification unit is further configured to determine a stock level based on the identified items.

In one embodiment, the product identification unit is configured to identify items by determining whether a plurality of dimensions of the 3D difference data are within a tolerance of a plurality of dimensions of each 3D item model.

In one embodiment, the memory is further configured to store a location database comprising an intended location on the storage unit of each of the plurality of 3D item models, and the product identification unit is configured identify items by comparing the intended location and actual location.

In one embodiment, the product identification unit is configured to identify an incorrectly placed item based on the comparison of intended and actual locations.

In one embodiment, the system further comprises an alert generation unit configured to generate an alert if the determined stock level is less than a predetermined stock level, and transmit the alert to a user device coupled to the system by a communication network.

In one embodiment, the scanner device is configured to periodically capture the 3D model at a predetermined time interval, and the memory is configured to store the determined stock level associated with each captured 3D model.

In one embodiment, the scanner device comprises a portable laser scanner adapted to be operated by a user.

In one embodiment, the system further comprises a baseline generation unit configured to generate the baseline 3D model by combining a plurality of smaller models.

In one embodiment, the baseline 3D model of the storage unit is a part of a larger 3D model of a retail store.

According to some embodiments, there is provided a method of monitoring items held on a storage unit, the method comprising:
  capturing a 3D model of the storage unit;
  comparing the captured 3D model to a baseline 3D model;
  generating 3D difference data corresponding to a difference between the captured and baseline 3D models, and
  identifying items present in the 3D difference data based on a stored plurality of 3D item models, each 3D item model corresponding to an item intended to be held on the storage unit.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1:
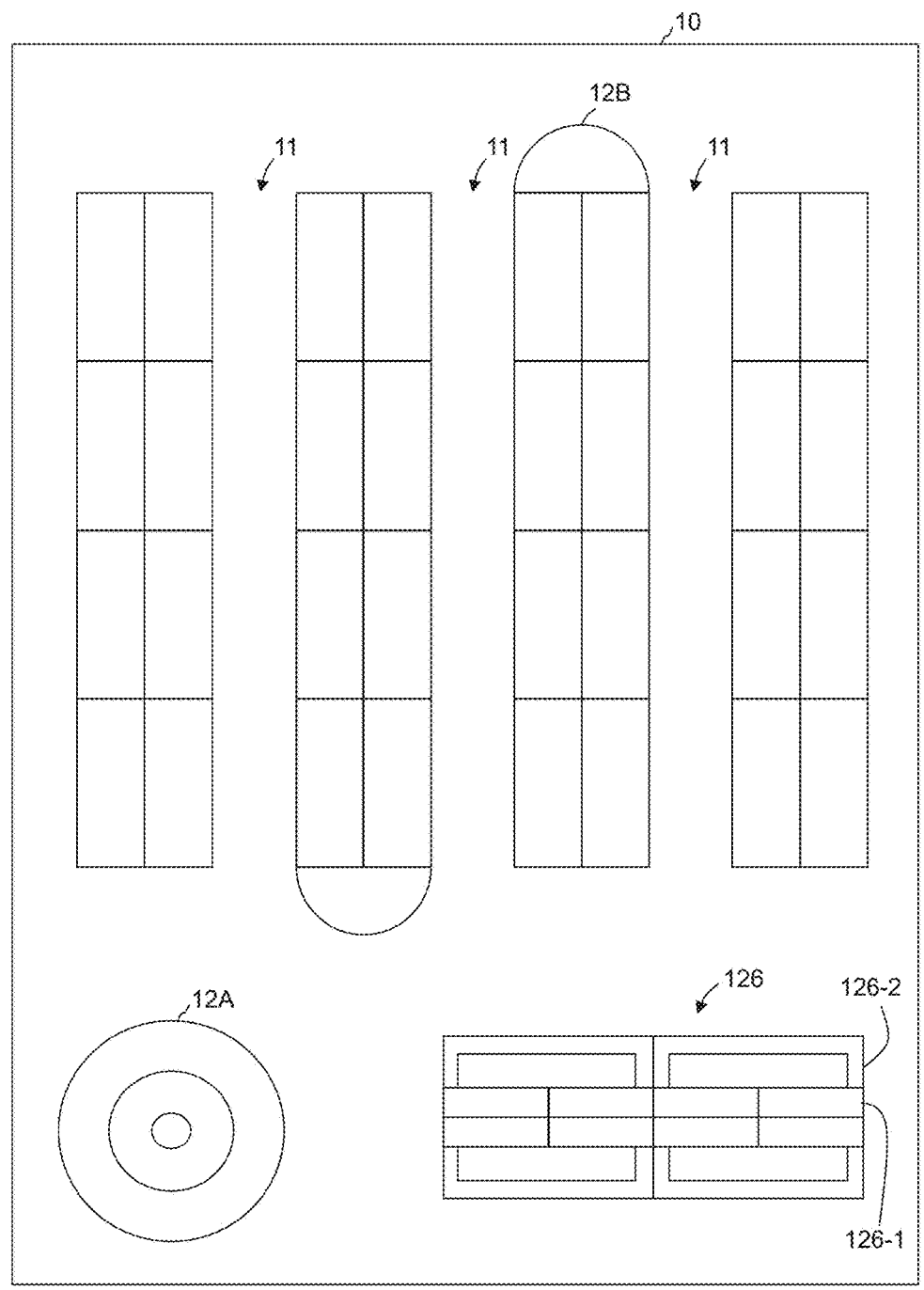
FIG. 1 is a schematic plan view of an exemplary retail store in which an exemplary system for monitoring items operates.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In overview, some embodiments of the present invention take a baseline scan of the environment of a storage unit, such as a shelf, when it is correctly stocked and subsequently take periodic scans of the same unit to assess whether there has been any change. In some embodiments 3D pattern matching can be utilised to identify specific products. As a result of such monitoring, alerts can be generated at appropriate times to alert members of staff that restocking is required.

FIG. 1 shows a schematic view of a physical environment in which embodiments of the invention may operate. In one example, the physical environment is a retail store 10. The retail store 10 comprises a plurality of storage units 12, each of which stores and displays items available for sale in the retail store.

Typically, the storage units 12 comprise a number of shelves to hold the items, and are arranged so as to define a plurality of aisles 11. Customers move around the retail store 10, progressing up and down the aisles 11 and selecting the items that they wish to purchase, before progressing to a checkout (not shown) to pay for the items.

In addition to the storage units 12 arranged to define the aisles 11, the retail store 10 may also comprise storage units 12 of differing configurations. For example, free-standing storage units 12A may be placed around the retail store 10, or additional display units 12B arranged on the end of the aisles 11. In further examples, the storage units 12 may be freezer storage units 12C for storing frozen goods, comprising several freezer cabinets 12C-1 disposed above chest freezers 12C-2. It will be understood by those skilled in the art that a variety of further types of storage units 12 may be employed within the retail 10, and that the embodiments described below are not dependent upon any particular arrangement or type of storage unit 12.

It will be further understood that the embodiments described below could equally be applied to other physical environments in which the monitoring of items on storage units 12 is desired. For example, the physical environment may be a warehouse in which stock is held, such as a warehouse attached to a retail store 10.

Figure 2:
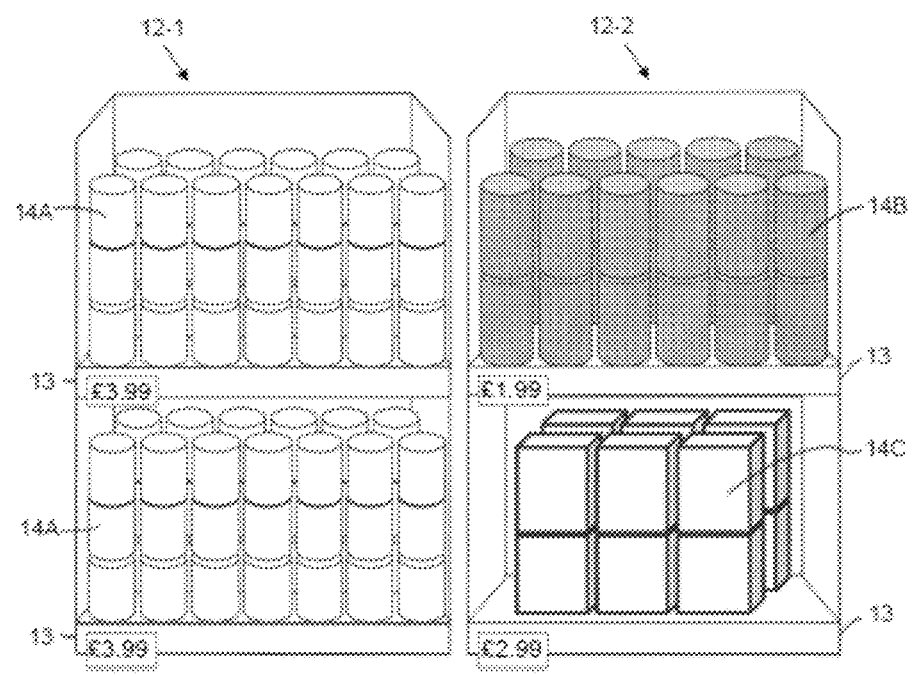
FIG. 2 is a schematic perspective view of exemplary storage units on which an exemplary system for monitoring items operates.

An example storage unit 12 will now be described with reference to FIG. 2. FIG. 2 shows a front perspective view of two storage units 12-1 and 12-2. Each of the storage units 12-1 and 12-2 comprise a plurality of shelves 13, on which the stock is held for display. It will be understood that the number of shelves 13 may be varied, for example according to the size of the goods to be displayed thereon.

In the example shown in FIG. 2, both shelves 13 of the storage unit 12-1 are arranged to hold a plurality of items of a first product line 14A. On the other hand, the storage unit 12-2 is arranged to hold items of a second product line 14B on its upper shelf 13, and items of a third product line 14C on its lower shelf 13. The storage units 12-1 and 12-2 are shown in a fully-stocked state. As will be appreciated from FIG. 2, the desired level of stock on each shelf 13 may vary according to the nature of the product, the size of the packaging and so on. Although in this example each shelf 13 holds items from a single product line 14, it will be understood that each shelf 13 may instead hold a plurality of product lines 14.

Figure 3:
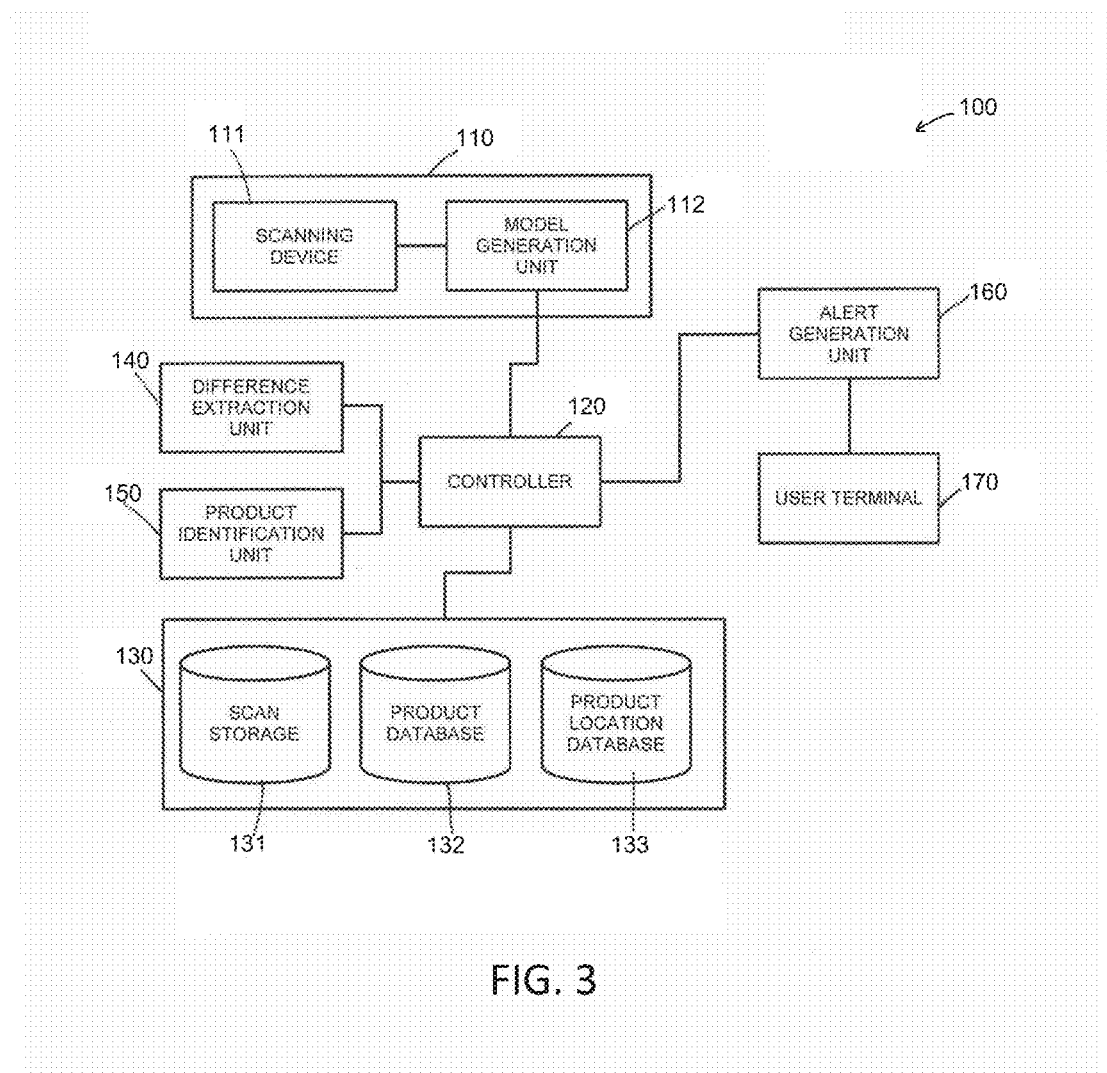
FIG. 3 is a block diagram of an exemplary system for monitoring items.

FIG. 3 shows a schematic diagram of an example system 100 for monitoring items held on storage units 12.

In one example, the system 100 comprises a scanning apparatus 110, a controller 120, a memory 130, a difference extraction unit 140, a product identification unit 150 and an alert generation unit 160.

The scanning apparatus 110 comprises one or more 3D scanning devices 111. The or each 3D scanning device 111 is configured to scan the interior of the retail store 10, and particularly the storage units 12 therein and capture scan data representing the scanned area. In one example, the 3D scanning device 111 is a laser range finding device, configured to emit a pulse of light, receive the reflection of the emitted pulse from the surface of an object (e.g. a storage unit 12), and calculate the distance from the 3D scanning device 111 to the object based on the round-trip time of the pulse. The 3D scanning device 111 may calculate the distance of a large number of points (for example, millions or billions of points), thereby forming a point cloud which represents the scanned area.

In one example, the 3D scanning device 111 is a stationary 3D scanning device, placed in a fixed position within the retail store 10 so as to capture a scan. For example, the device 111 may be mounted to the ceiling of the store 10, or some other convenient vantage point which allows the device 111 to scan the portion of the retail store 10 which is of interest. In one example, the 3D scanning device 111 may be configured to be movable within the retail store 10. For example, the 3D scanning device 111 may be mounted on rails (not shown) in the ceiling of the store 10, so as to be conveyed along a predetermined path whilst scanning. In one example, the 3D scanning device 111 is a portable scanner, which may be held by a user whilst in use. It will be understood that the scanning apparatus 110 may comprise a mixture of the above-mentioned types of scanning device 111. For example, a stationary or rail-mounted scanning device 111 may be used to capture models of the whole store 10, or may be configured so as to capture models on a periodic basis, and a portable scanner may be used by a member of staff to scan a particular storage unit 12 of interest on an ad hoc basis.

The scanning apparatus 110 further comprises a model generation unit 112 configured to generate a 3D model from the scan data. In one example, the model generation unit 112 creates a polygonal mesh, in which the points of the point cloud are filled with polygons, such as triangles. In one example, the model generation unit 112 is configured to apply a 3D model simplification algorithm, which reduces the number of surfaces present in the model in order to reduce processing overheads, whilst still retaining sufficient detail in the model to accurately capture the dimensions of the items on the storage units 12.

In one example, the system 100 further comprises a baseline generation unit (not shown) configured to combine a plurality of smaller 3D models so as to create a single 3D model. For example, if scans are taken of several regions of the store, respective 3D models of each region result. The baseline generation unit is configured to identify areas of overlap between the respective models and "stitch" together the respective models, resulting in the single 3D model. In one example, the baseline generation unit may be part of the model generation unit 112.

In one example, the scanning apparatus 110 is configured to capture a baseline model of the retail store 10. The baseline model corresponds to the retail store 10 in a predetermined state, such as a state in which all of the storage units 12 are fully and correctly stocked with items. The scanning apparatus is further configured to capture further models of the retail store 10 during normal operation.

The controller 120 is configured to control the operations of the system 100 and manage access to the memory 130. The controller 120 may comprise a processor.

The memory 130 comprises a scan storage 131, a product database 132 and a product location database 133.

The scan storage 131 is configured to store the 3D models generated by the scanning apparatus 110, including a captured baseline 3D model of the retail store 10 in a predetermined state.

The product database 132 is configured to store 3D models of items of each product line 14 stocked by the retail store 10. These models may be routinely captured by the retailer as new product lines 14 are stocked by the retail store 10. In one example, the product database 132 is updated periodically with models of new product lines 14. In one example, the product database 132 is also configured to store the desired quantity of each product line 14. In one example, the product database 132 is configured to store the actual determined quantity of each product line 14, at a given point in time.

The product location database 133 is configured to store the intended location of each product line 14 within the store 10. In one example, the intended location is expressed in terms of a reference to the storage unit 12 and shelf 13 thereof on which the product line 14 should be displayed. In one example, the intended location is expressed in terms of spatial coordinates within a 3D model of the retail store 10.

The difference extraction unit 140 is configured to identify and extract the differences between 3D models of the same region or area of the store 10. Particularly, the difference extraction unit 140 is operable to perform a comparison of two 3D models, identify the regions in the 3D model which differ, and generate difference data corresponding to the differing regions. In one example, the difference data comprises a 3D model of the differing region. Particularly, the difference extraction unit 140 is configured to extract the differences between the baseline model and subsequent models of the retail store 10 in operation. In examples where the subsequent models relate to only a part of the retail store 10, the difference extraction unit 140 is configured to compare the subsequent model to only the corresponding portion of the baseline model, rather than the whole baseline model.

The product identification unit 150 is configured to identify the items present within the difference data, based on the 3D models of items stored in the product database 132. The difference data is compared to each of the 3D models stored in the product database 132. A portion of the difference data which has physical dimensions matching that of a 3D model of an item may be determined to be that item. In the case where the difference data refers to a plurality of items, the product identification unit 150 is configured to identify each item present in the difference data. The product identification unit 150 is configured to generate product difference data, which represents which product items, and the quantity thereof, and which are present in one scan but not another scan. Accordingly, the product identification unit 150 may identify and quantify the items which are present in the baseline model, but missing from a subsequently captured model.

In one example, the product identification unit 150 is further configured to identify items which are not placed in their intended location within the retail store 10, for example, items which have been placed on the wrong storage unit 12 or shelf 13. The product identification unit examines the product difference data, and identifies any products which are not present in the baseline model, but which are present in the subsequent scan. The identified products are then compared with their intended location, as stored in the product location database 133. Based on the comparison, the product identification unit generates misplaced item data, detailing the current position of each misplaced item. The misplaced item data may further comprise the correct location of the misplaced item.

In one example, the product identification unit 150 determines a stock level of each product line 14 based on the product difference data. The stock level is determined by retrieving the desired quantity of items of the product line 14 from the product database 132, and subtracting therefrom the quantity of that product line 14 which is determined to be missing based on the product difference data.

The alert generation unit 160 is configured to generate an alert based on the determinations made by the product identification unit 150, and transmit the generated alert to a user terminal 170. In one example, the alert generation unit 160 is coupled to a user terminal 170 by means of a suitable communication network. The user terminal 170 may be any suitable electronic device, including, but not limited to, a personal computer, a tablet computer, a smart phone, or a wearable device.

The alert generation unit 160 is configured to generate and transmit an alert when the product difference data and the misplaced item data meet certain criteria. In one example, if the determined stock level of a product line 14 is lower than a predetermined threshold, the alert generation unit 160 generates an alert indicating that the items should be replenished.

An example of the system 100 in use will now be described with reference to FIGS. 4A-C.

Figure 4A:
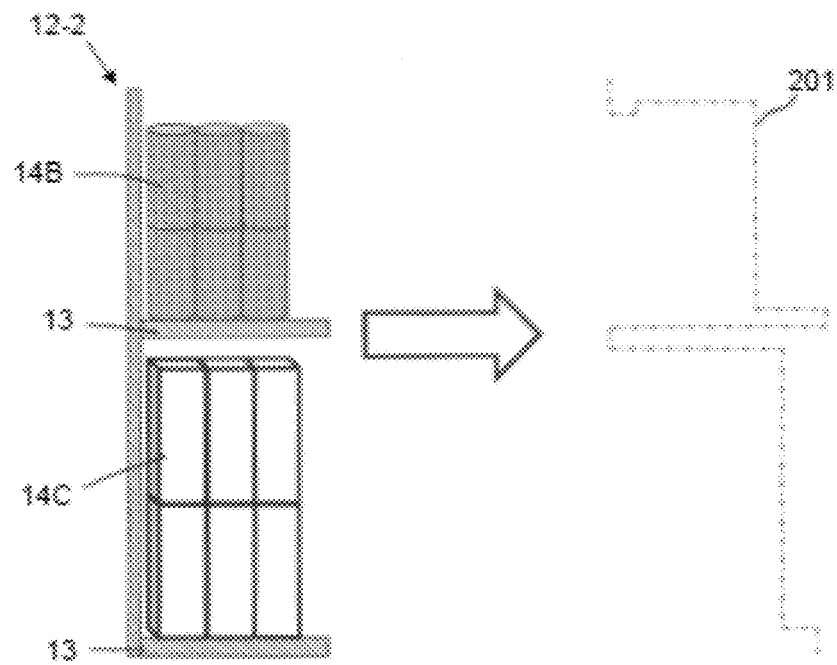
FIG. 4A is a cross-sectional view of an exemplary storage unit in a fully stocked state and the resulting 3D model generated by an exemplary system for monitoring items.
Figure 4B:
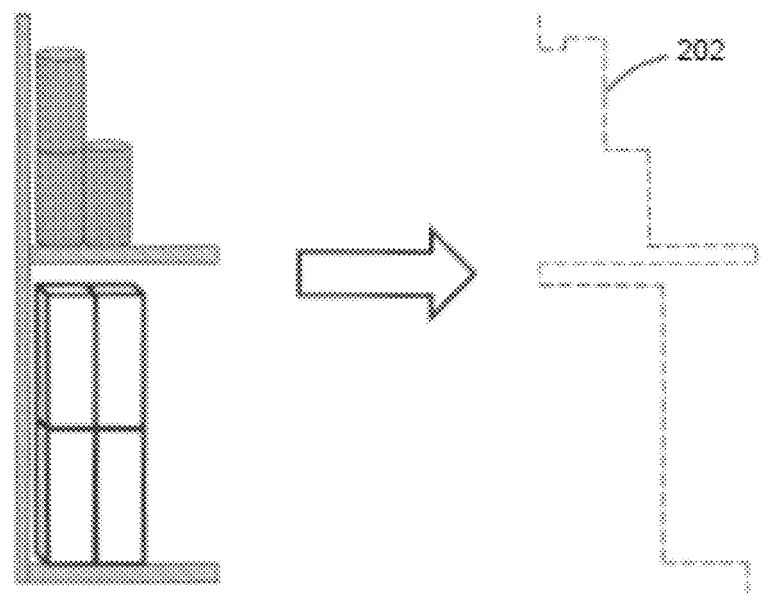
FIG. 4B is a cross-sectional view of an exemplary storage unit in a partially stocked state and the resulting 3D model generated by an exemplary system for monitoring items.

FIG. 4A shows a cross-sectional view of the storage unit 12-2 in a fully stocked state. The storage unit 12-2 comprises two shelves 13. The upper shelf 13 holds a plurality of product items 14B and the lower shelf 13 holds a plurality of product items 14C.

Firstly, the scanning apparatus 110 captures a baseline 3D model 201 of the storage unit 12-2 in the fully stocked state. In one example, the 3D scanning device 111 is directed towards the storage 12-2 and a point cloud based on a large number of distance measurements. The model generation unit 112 subsequently generates a 3D model 201 from the point cloud, for example by transforming the point cloud into a polygonal mesh.

In one example, the capture of the baseline model 201 of the storage unit 12-2 may form part of a larger process of capturing a baseline model of the entire retail store 10. The baseline model may be composed by the baseline generation unit combining a plurality of captured models. For example several models may be captured of areas of the store 10, and combined to create one baseline model.

Optionally, the model generation unit 112 applies a 3D model simplification algorithm, so as to reduce the number of polygons present therein. A cross-sectional representation of the captured 3D baseline model 201 is shown in FIG. 4A.

Next, the controller 120 stores the captured baseline in the scan storage 131 of the memory 130. The product database 132 and product location database 133 are pre-populated with details of the product items 14 and their intended location.

Next, the scanning apparatus 110 captures a subsequent 3D model 202 of the storage unit 12-2. FIG. 4B shows the storage unit 12-2 in a partially stocked state, wherein several of the product items 14B and 14C have been removed. The 3D model 202 is then generated in the same way or a similar way as the baseline 3D model 202.

Figure 4C:
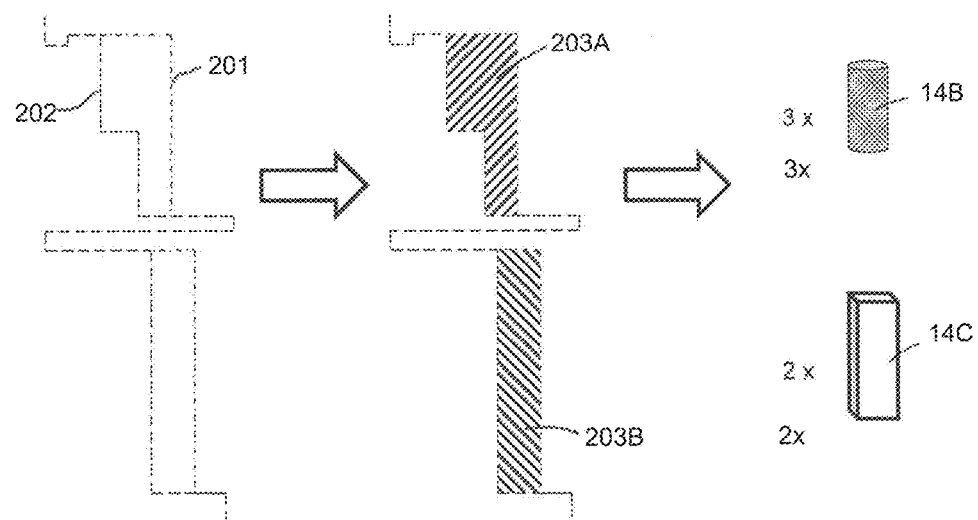
FIG. 4C is a diagram illustrating the operation of an exemplary difference extraction unit of an exemplary system for monitoring items in use.

Next, as shown in FIG. 4C, the difference extraction unit 140 compares the baseline 3D model 201 and the subsequent 3D model 202. The comparison results in difference data 203, which represents the difference between the two models 201 and 202.

Next, the product identification unit 150 determines the product items present in the difference data 203, based on the 3D models stored in the product database 132. In the example shown in FIG. 4C, the product identification unit determines that a first region 203A of the difference data corresponds to three items of product 14B and a second region 203B of the difference data corresponds to two items of product 14C.

Optionally, the product identification unit 150 determines if the difference data 203 comprises any misplaced items, based on the product location database 133. In one example, the product identification unit 150 generates misplaced item data detailing the current position of any misplaced items. In one example, the misplaced item data also includes the correct, intended position of the misplaced items.

Next, the product identification unit 150 determines the stock level of the product lines 14B and 14C present on the storage unit 12-2. The product identification unit 150 queries the product database 132 to establish the intended stock level of each item. For example, the product identification unit 150 may establish that the storage unit 12-2 is intended to hold 6 items of product 14B. Subsequently, the product identification unit 150 determines the stock level by subtracting the number of items 14B present in the difference data 203 (i.e. 3) from the intended stock level. In the example of FIG. 4C, the product identification unit 150 determines that the stock level of product 14B is 3. The system 100 stores the determined stock level in the product database 132.

In the event that the determined stock level of a particular product line 14 falls below a given threshold, the alert generation unit 160 generates an alert and transmits the alert to the user terminal 170. In one example, the alert indicates that the product line 14 needs replenishment. In one example, each product line 14 is delivered to the retail store in a plurality of packages, each package comprising a fixed number of items. For example, a given product may be supplied in a box comprising 25 items. In such an example, the threshold may be set based on the number of items in each package, such that an alert is only triggered when there is enough room on the storage unit 12 to add a whole package of stock.

In the event that the product identification unit 150 determines that items have been misplaced on the storage unit 12, the alert generation unit 160 generates an alert based on the misplaced item data and transmits the alert to the user terminal 170. In one example, the alert details the current position of the misplaced items and the correct position of the misplaced items.

Accordingly, members of retail store staff operating the user terminal 170 can be conveniently informed of product lines 14 in need of replenishment, or product items which have been incorrectly placed on their respective storage units 12.

Figure 5:
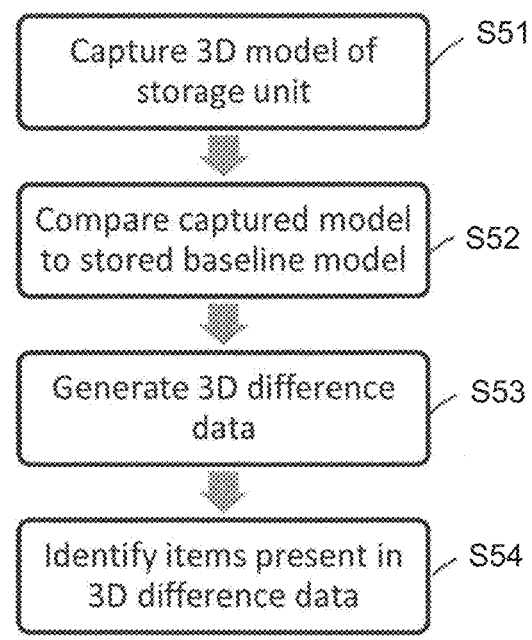
FIG. 5 is a flowchart of an exemplary method of monitoring items.

FIG. 5 is a flowchart of an exemplary method of monitoring items on a storage unit.

The method includes the step S51 comprises capturing a 3D model of the storage unit 12, using the scanning apparatus 110. The method includes the step S52 of comparing the captured 3D model to a stored baseline 3D model, using the difference extraction unit 140. The method includes the step S53 of generating 3D difference data corresponding to a difference between the captured and baseline 3D models, using the difference extraction unit 140. The method includes the step S54 of identifying items present in the 3D difference data based on a stored plurality of 3D item models, each 3D item model corresponding to an item intended to be held on the storage unit 12, using the product identification unit 150. Further steps may be included in the method, as have been described herein.

The above-described systems and methods may advantageously allow a retail store to conveniently monitor the level of stock held on storage units in the retail store. The systems and methods may ensure that store staff are alerted to any relevant changes in stock level, so that appropriate replenishment can take place. Consequently, the storage units may be more easily maintained in a well stocked state, thereby avoiding customer inconvenience associated with items being out-of-stock. In addition, staff time spent examining the state of storage units and manually determining the stock level of items held thereon is saved. Furthermore, staff time spent needlessly attempting to refill storage units which have not been sufficiently depleted to warrant replenishment is saved.

The above-described systems and methods may also advantageously allow a retail store to conveniently identify and correct misplaced items on storage units. Consequently, customer confusion regarding the misplaced items is avoided, and the general appearance of the retail store may be improved, thereby increasing shopper convenience and sales of goods.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A system for monitoring items held on a storage unit, comprising:
    a scanner device configured to capture a 3D model of the storage unit and the items on the storage unit, wherein the scanner device comprises a laser range finding device configured calculate a distance from the scanner device based on a reflected emitted pulse, wherein the scanner device is configured to: calculate distances between numerous points from the scanner device and at least the storage unit based on reflected emitted pulses thereby forming a point cloud representation of an area being scanned, and transform the point cloud into a polygonal mesh to capture the 3D model of the storage unit and the plurality of items stored on the storage unit;
    a memory configured to store a baseline 3D model of the storage unit in a predetermined stocked state and a plurality of 3D item models, each 3D item model corresponding to an item intended to be held on the storage unit;
    a difference extraction unit configured to compare the captured 3D model to the baseline 3D model and generate 3D difference data corresponding to a difference between the captured and baseline 3D models, and
    a product identification unit configured to identify items present in the 3D difference data based on the stored plurality of 3D item models.

2. The system of claim 1, wherein the product identification unit is further configured to determine a stock level based on the identified items.

3. The system of claim 2, wherein the product identification unit is configured to identify items by determining whether a plurality of dimensions of the 3D difference data are within a tolerance of a plurality of dimensions of each 3D item model.

4. The system of claim 3, wherein:
    the memory is further configured to store a location database comprising an intended location on the storage unit of each of the plurality of 3D item models, and
    the product identification unit is configured identify items by comparing the intended location and actual location.

5. The system of claim 4, wherein the product identification unit is configured to identify an incorrectly placed item based on the comparison of intended and actual locations.

6. The system of claim 2, wherein the system further comprises an alert generation unit configured to generate an alert if the determined stock level is less than a predetermined stock level, and transmit the alert to a user device coupled to the system by a communication network.

7. The system of claim 2, wherein the scanner device is configured to periodically capture the 3D model at a predetermined time interval, and the memory is configured to store the determined stock level associated with each captured 3D model.

8. The system of claim 1, wherein the scanner device comprises a portable laser scanner adapted to be operated by a user.

9. The system of claim 2, wherein the system further comprises a baseline generation unit configured to generate the baseline 3D model by combining a plurality of smaller models.

10. The system of claim 8, wherein the baseline 3D model of the storage unit is a part of a larger 3D model of a retail store.

11. The system of claim 1, wherein the product identification unit is configured to identify items by determining whether a plurality of dimensions of the 3D difference data are within a tolerance of a plurality of dimensions of each 3D item model.

12. The system of claim 1, wherein:
the memory is further configured to store a location database comprising an intended location on the storage unit of each of the plurality of 3D item models, and
the product identification unit is configured identify items by comparing the intended location and actual location.

13. The system of claim 1, wherein the system further comprises a baseline generation unit configured to generate the baseline 3D model by combining a plurality of smaller models.

14. The system of claim 13, wherein the baseline 3D model of the storage unit is a part of a larger 3D model of a retail store.

15. The system of claim 1, wherein the baseline 3D model of the storage unit is a part of a larger 3D model of a retail store.

16. A method of monitoring items held on a storage unit, the method comprising:

capturing a 3D model of the storage unit and the items on the storage unit, wherein the capturing the 3D model comprises calculating distances between numerous points from a scanner device and at least the storage unit based on reflected emitted pulses, forming a point cloud representation of an area being scanned, and transforming the point cloud into a polygonal mesh to capture the 3D model of the storage unit and the plurality of items stored on the storage unit;

comparing the captured 3D model to a baseline 3D model of the storage unit in a predetermined stocked state and a plurality of 3D item models, each 3D item model corresponding to an item intended to be held on the storage unit;

generating 3D difference data corresponding to a difference between the captured and baseline 3D models, and identifying items present in the 3D difference data based on a stored plurality of 3D item models, each 3D item model corresponding to an item intended to be held on the storage unit.

* * * * *

UNITED STATES PATENT AND TRADEMARK OFFICE
CERTIFICATE OF CORRECTION

PATENT NO. : 10,346,794 B2
APPLICATION NO. : 15/061443
DATED : July 9, 2019
INVENTOR(S) : Donald R. High et al.

It is certified that error appears in the above-identified patent and that said Letters Patent is hereby corrected as shown below:

In the Claims

Column 10, Line 7, Claim 1, insert --to-- after "configured".

Column 10, Line 40, Claim 4, insert --to-- after "configured".

Column 11, Line 8, Claim 12, insert --to-- after "configured".

Signed and Sealed this
Twelfth Day of November, 2019

Andrei Iancu
*Director of the United States Patent and Trademark Office*